United States Patent
Kawai et al.

(10) Patent No.: US 9,344,651 B2
(45) Date of Patent: May 17, 2016

(54) SIGNAL PROCESSING APPARATUS FOR CORRECTING AN OUTPUT SIGNAL OF A FOCUS DETECTING PIXEL CELL TO IMPROVE A CAPTURED IMAGE QUALITY

(71) Applicant: FUJIFILM Corporation, Tokyo (JP)

(72) Inventors: Tomoyuki Kawai, Saitama (JP); Masaaki Koshiba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/536,209

(22) Filed: Nov. 7, 2014

(65) Prior Publication Data
US 2015/0062400 A1  Mar. 5, 2015

Related U.S. Application Data

(63) Continuation of application No. PCT/JP2013/060209, filed on Apr. 3, 2013.

(30) Foreign Application Priority Data

May 10, 2012  (JP) .............. 2012-108560

(51) Int. Cl.
| | |
|---|---|
| H04N 5/232 | (2006.01) |
| H04N 5/357 | (2011.01) |
| G02B 7/34 | (2006.01) |
| H04N 5/369 | (2011.01) |
| H04N 5/378 | (2011.01) |
| H04N 9/04 | (2006.01) |

(52) U.S. Cl.
CPC .............. *H04N 5/357* (2013.01); *G02B 7/34* (2013.01); *H04N 5/23212* (2013.01); *H04N 5/3696* (2013.01); *H04N 5/378* (2013.01); *H04N 9/045* (2013.01)

(58) Field of Classification Search
CPC ..................................... H04N 5/357
USPC ......................................... 348/350
See application file for complete search history.

(56) References Cited

U.S. PATENT DOCUMENTS

| | | |
|---|---|---|
| 2007/0237512 A1 | 10/2007 | Kusaka |
| 2011/0109775 A1 | 5/2011 | Amano |

FOREIGN PATENT DOCUMENTS

| | | |
|---|---|---|
| JP | 2007-282107 A | 10/2007 |
| JP | 2008-040087 A | 2/2008 |
| JP | 2010-062640 A | 3/2010 |
| JP | 2010-093757 A | 4/2010 |

OTHER PUBLICATIONS

Written Opinion of the International Searching Authority dated May 7, 2015 (Form PCT/ISA/237) issued in PCT/JP2013/060209.

*Primary Examiner* — Usman Khan
(74) *Attorney, Agent, or Firm* — Birch, Stewart, Kolasch & Birch, LLP

(57) ABSTRACT

An imaging element 5 includes an imaging pixel cell 30 and focus detecting pixel cells 31R and 31L. The digital signal processing unit 17 determines which one of interpolation processing and gain correction processing is to be performed using at least the F value at the time of imaging. The interpolation processing corrects the output signal of the focus detecting pixel cell through signal interpolation using the output signals of the surrounding imaging pixel cells, and the gain correction processing amplifies and corrects the output signal of the focus detecting pixel cell by a gain.

12 Claims, 12 Drawing Sheets

FIG. 9

| FOCUS DISTANCE f [mm] | THRESHOLD VALUE OF F VALUE |
|---|---|
| 28 ≦ f < 35 | F2.4 |
| 35 ≦ f < 50 | F2.8 |
| 50 ≦ f < 80 | F3.5 |
| 80 ≦ f < 120 | F5.0 |
| 120 ≦ f | F8.0 |

SIGNAL PROCESSING APPARATUS FOR CORRECTING AN OUTPUT SIGNAL OF A FOCUS DETECTING PIXEL CELL TO IMPROVE A CAPTURED IMAGE QUALITY

CROSS REFERENCE TO RELATED APPLICATION

This is a continuation of International Application No. PCT/JP2013/060209 filed on Apr. 3, 2013, and claims priority from Japanese Patent Application No. 2012-108560, filed on May 10, 2012, the entire disclosures of which are incorporated herein by reference.

BACKGROUND

1. Technical Field

The present invention relates to a signal processing apparatus.

2. Related Art

Recently, as the resolution of a solid-state imaging element such as a charge coupled device (CCD) image sensor and a complementary metal oxide semiconductor (CMOS) image sensor becomes higher, a demand for an information device having an imaging function such as a digital still camera, a digital video camera, a cellular phone, and a personal digital assistant (PDA) is rapidly increasing. Meanwhile, the information device having an imaging function as described above is referred to as an imaging device.

However, a focus control method which focuses on a main subject includes a contrast auto focus (AF) method and a phase difference AF method. Since the phase difference AF method may detect a focusing position with high precision at a high speed as compared with the contrast AF method, the phase difference AF method is widely employed in various imaging devices.

As a solid-state imaging element mounted in an imaging device which controls a focus by a phase difference AF method, for example, a solid-state imaging element in which a pair of focus detecting pixel cells having light shielding film openings, which are off-centered in reverse directions to each other, are discretely provided on an entire surface of an imaging region is used (see Patent Literature 1 (JP-A-2010-62640)).

An area of the light shielding film opening of the focus detecting pixel cell is smaller than those of the other normal pixel cells and as a result, it is insufficient to use the output signal of the focus detecting pixel cell as a captured image signal. Therefore, it is required to correct the output signal of the focus detecting pixel cell.

Patent Literature 1 discloses a method that selectively performs first correction processing which interpolates an output signal of a focus detecting pixel cell using output signals of normal pixel cells around the focus detecting pixel cell and second correction processing which amplifies and corrects the output signal of the focus detecting pixel cell in accordance with a variation of the output signals of the normal pixel cells around the focus detecting pixel cell.

SUMMARY OF INVENTION

As disclosed in Patent Literature 1, when the correction processing is switched in accordance with the variation of the output signals of the normal pixel cells, the correction may not be precisely performed in some cases.

For example, even when the variation of the output signals is small, if a diaphragm is placed at a small diaphragm side, a ratio of a sensitivity of the focus detecting pixel cell and a sensitivity of the normal pixel cell becomes small. That is, since an amplifying gain which is used for the second correction processing may be small, the noise when the second correction processing is performed may be suppressed from being amplified. As a result, the correction may be performed more precisely than the case where the first correction processing is performed.

The present invention has been made under the above described circumstances in an effort to provide an a signal processing apparatus which precisely corrects an output signal of a focus detecting pixel cell to improve a captured image quality, an imaging device including the same, and a signal correcting method.

According to an aspect of the present invention, it is disclosed a signal processing apparatus for processing a signal from an imaging element, the imaging element including a plurality of first pixel cells for imaging and a plurality of second pixel cells for focus detection which are two dimensionally arranged and imaging a subject through an optical system, the signal processing apparatus comprising: a correction processing unit which performs one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell, wherein the correction processing unit determines which one of the first correction processing and the second correction processing is to be performed using at least an F value at the time of imaging which is an F value of a diaphragm included in the optical system at the time of imaging to obtain a signal to be corrected.

According to another aspect of the present invention, it is disclosed an imaging device comprising: the signal processing apparatus, and the imaging element.

According to another aspect of the present invention, it is disclosed a signal correcting method of correcting signals output from a plurality of second pixel cells of an imaging element, the imaging element imaging a subject through an optical system and including a plurality of first pixel cells for imaging and the second pixel cells for focus detection which are two dimensionally arranged, the method comprising: a correction processing step which performs one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell, wherein in the correction processing step, it is determined which one of the first correction processing and the second correction processing is to be performed using at least an F value at the time of imaging which is an F value of a diaphragm included in the optical system at the time of imaging to obtain a signal to be corrected.

Any one of the present invention may provide an a signal processing apparatus which precisely corrects an output signal of a focus detecting pixel cell to improve a captured image quality, an imaging device including the same, and a signal correcting method.

BRIEF DESCRIPTION OF DRAWINGS

FIG. 9 is a view explaining that a determination threshold value is changed depending on a focal distance in a fourth modified exemplary embodiment of the digital camera illustrated in FIG. 1.

DESCRIPTION OF EMBODIMENTS

Hereinafter, exemplary embodiments of the present invention will be described with reference to the drawings.

(First Exemplary Embodiment)

Figure 1:
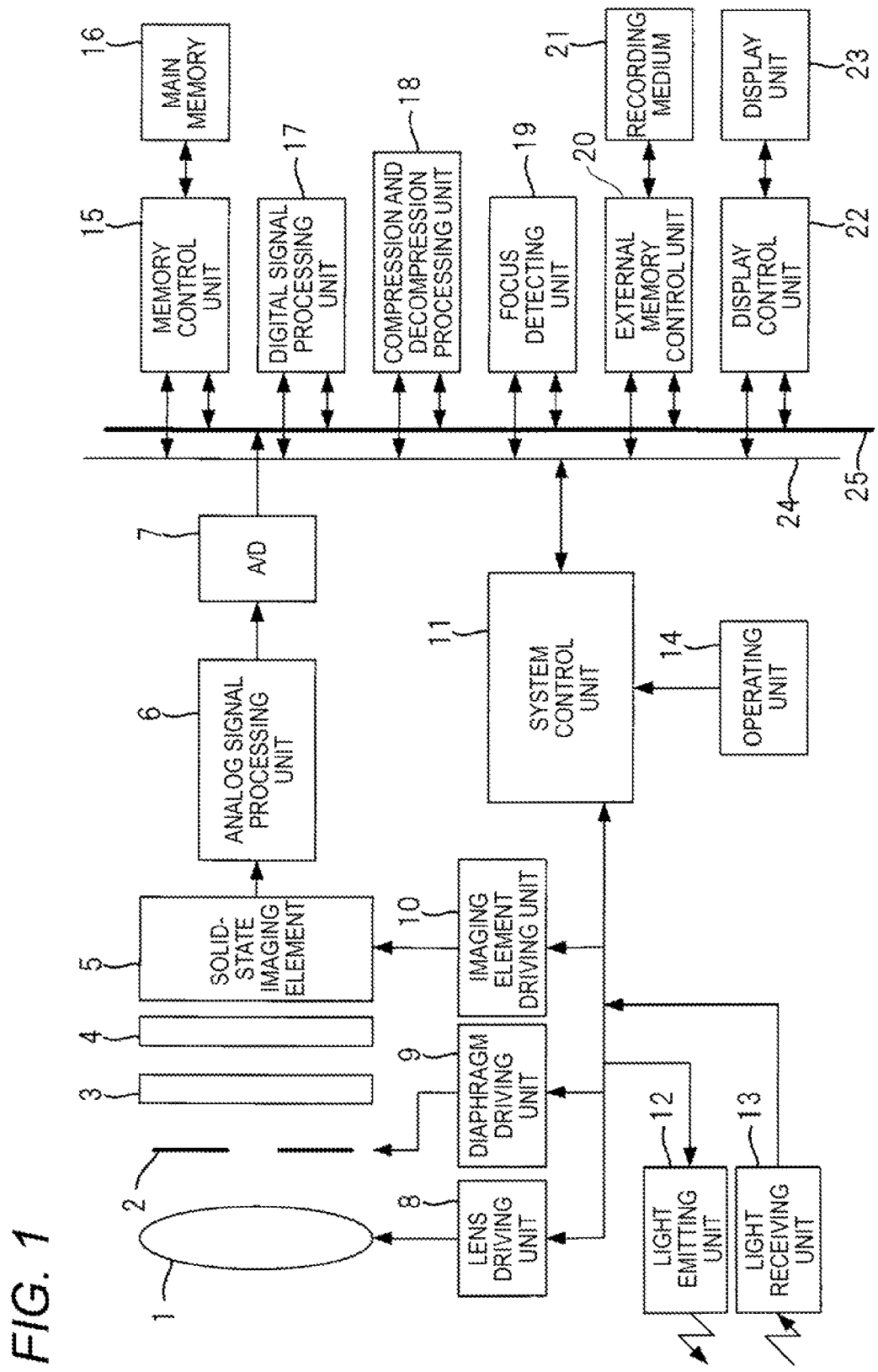
FIG. 1 is a diagram illustrating a schematic configuration of a digital camera which is an example of an imaging device for explaining a first exemplary embodiment of the present invention.

FIG. 1 is a diagram illustrating a schematic configuration of a digital camera as an example of an imaging device for explaining a first exemplary embodiment of the present invention.

An imaging system of a digital camera illustrated in FIG. 1 includes a photographing optical system having a photographing lens 1 including a lens such as a focus lens or a zoom lens and a diaphragm 2, a solid-state imaging element 5 such as a CCD image sensor or a CMOS image sensor, an infrared cut filter (IRCUT) 3 and an optical low pass filter (OLPF) 4 which are provided between the photographing optical system and the solid-state imaging element 5.

The solid-state imaging element 5 is configured such that a plurality of imaging pixel cells and two types of focus detecting pixel cells which receive a pair of light fluxes passing through different pupil regions of the photographing optical system are two dimensionally arranged. The solid-state imaging element 5 receives an image which is formed by the photographing lens 1 to simultaneously output a captured image signal and a pair of focus detecting signals corresponding to the pair of light fluxes.

A system control unit 11 which collectively controls an entire electrical control system of the digital camera controls a flash light emitting unit 12 and a light receiving unit 13. Further, the system control unit 11 controls a lens driving unit 8 to adjust a position of a focus lens which is included in the photographing lens 1 or a position of the zoom lens which is included in the photographing lens 1. Further, the system control unit 11 controls an aperture size of the diaphragm 2 through a diaphragm driving unit 9 so as to adjust an exposure amount.

Further, the system control unit 11 drives the solid-state imaging element 5 through an imaging element driving unit 10 to output a subject image captured through the photographing lens 1 as a captured image signal. An instruction signal from a user is input to the system control unit 11 through an operating unit 14.

The electrical control system of the digital camera further includes an analog signal processing unit 6 connected to an output of the solid-state imaging element 5 to perform analog signal processing such as correlated double sampling processing and an A/D converting circuit 7 which converts a RGB color signal output from the analog signal processing unit 6 into a digital signal. The analog signal processing unit 6 and the A/D converting circuit 7 are controlled by the system control unit 11.

Moreover, the electrical control system of the digital camera includes a main memory 16, a memory control unit 15 which is connected to the main memory 16, a digital signal processing unit 17 which performs various imaging processing on the captured image signal to generate photographed image data, a compression and expansion processing unit 18 which compresses the photographed image data generated in the digital signal processing unit 17 in a JPEG format or expands the compressed image data, a focus detecting unit 19 which calculates a defocus amount of the photographing lens 1 based on a phase difference of a pair of focus detection signals output from the focus detecting pixel cells of the solid-state imaging element 5, an external memory control unit 20 to which a detachable recording medium 21 is connected, and a display control unit 22 to which a display unit 23 mounted on a rear surface of a camera is connected. The memory control unit 15, the digital signal processing unit 17, the compression and expansion processing unit 18, the focus detecting unit 19, the external memory control unit 20, and the display control unit 22 are connected to each other by a control bus 24 and a data bus 25 to be controlled by a command from the system control unit 11.

Figure 2:
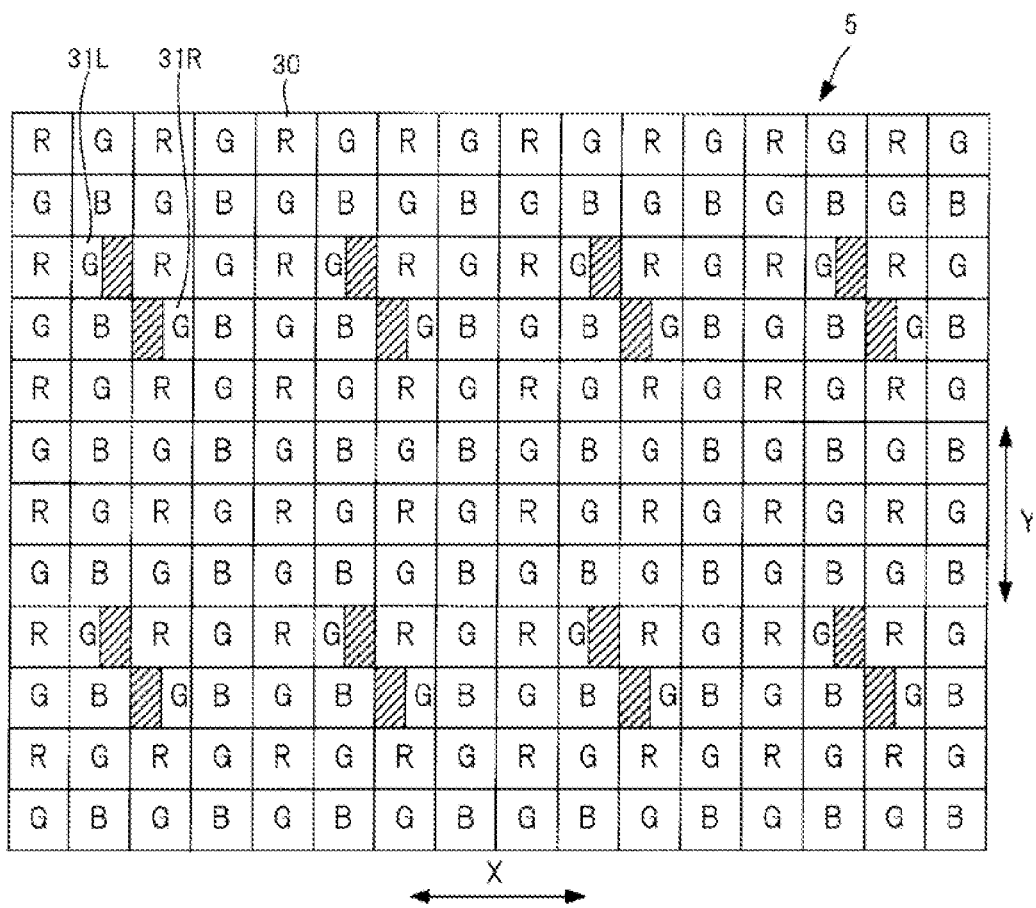
FIG. 2 is a schematic plan view illustrating a schematic configuration of a solid-state imaging element 5 which is mounted in the digital camera illustrated in FIG. 1.

FIG. 2 is a schematic plan view illustrating a schematic configuration of a solid-state imaging element 5 which is mounted in the digital camera illustrated in FIG. 1. In the solid-state imaging element 5, the focus detecting pixel cells are provided so as to be scattered in an entire surface or a part of an imaging region where the pixel cells are two dimensionally arranged. FIG. 2 illustrates an enlarged view of a part of the imaging region where the focus detecting pixel cells are provided.

The solid-state imaging element 5 includes a plurality of pixel cells (square shapes in the drawing) which is two-dimensionally (in a square lattice shape in an example of FIG. 2) arranged in a row direction X and a column direction Y orthogonal to the row direction. The plurality of pixel cells is formed such that pixel cell rows including a plurality of pixel cells which is disposed to be arranged in the row direction X at a constant pitch are disposed to be arranged in the column direction Y at a constant pitch. The plurality of pixel cells includes imaging pixel cells 30, focus detecting pixel cells 31L, and focus detecting pixel cells 31R. Each pixel cell includes a photoelectric converting unit which receives light and converts the light into a charge.

The imaging pixel cell 30 is a pixel cell which receives both a pair of light components (for example, a light component passing through a left side with respect to a major axis of the photographing lens 1 and a light component passing through a right side) which pass through the different pupil regions of the photographing lens 1 illustrated in FIG. 1.

The focus detecting pixel cell 31L is a pixel cell which receives one of the pair of light components and has a configuration in which an opening (a non-hatched region) of a photoelectric converting unit is deviated to the left side as compared with the imaging pixel cell 30.

The focus detecting pixel cell 31R is a pixel cell which receives the other one of the pair of light components and has a configuration in which an opening (a non-hatched region) of the photoelectric converting unit is deviated to the right side as compared with the imaging pixel cell 30.

However, the configuration of the focus detecting pixel cells is not limited as described above, but a known configuration may be employed.

A color filter is mounted above the photoelectric converting unit included in each pixel cell and the arrangement of color filters is a Beyer arrangement for all of the plurality of pixel cells which constitutes the solid-state imaging element 5.

In FIG. 2, "R" denotes a pixel cell mounted with a color filter which transmits a red (R) light component. Further, "G" denotes a pixel cell mounted with a color filter which transmits a green (G) light component. Furthermore, "B" denotes a pixel cell mounted with a color filter which transmits a blue (B) light component. In the example of FIG. 2, even though a color filter is mounted in the solid-state imaging element 5, the color filter may not be mounted.

The focus detecting pixel cells 31L are arranged in positions of the pixel cells mounted with the color filters which transmit the green G light component at three pixel cell intervals, in third and ninth pixel cell rows from the top of FIG. 2.

The focus detecting pixel cells 31R are arranged in positions of the pixel cells mounted with the color filters which transmit the green G light component at three pixel cell intervals, in fourth and tenth pixel cell rows from the top of FIG. 2.

The focus detecting pixel cell 31L and the focus detecting pixel cell 31R which are adjacent to each other in an oblique direction form a pair and the solid-state imaging element 5 has a configuration in which a plurality of the pairs is formed.

The focus detecting unit 19 illustrated in FIG. 1 calculates a focus adjustment state of the photographing lens 1 which is an amount deviated from the focused state and a direction thereof in this case, that is, a defocused amount using a signal group read out from the focus detecting pixel cell 31L, and the focus detecting pixel cell 31R.

The system control unit 11 illustrated in FIG. 1 controls a position of a focus lens included in the photographing lens 1 based on the defocused amount calculated by the focus detecting unit 19 to adjust a focus.

When a photographing instruction is issued in a state where the focus is adjusted, the system control unit 11 causes the solid-state imaging element 5 to capture an image, and the captured image signal output from the solid-state imaging element 5 by the imaging operation is received by the digital signal processing unit 17. The digital signal processing unit 17 corrects the output signal of the focus detecting pixel cell which is included in the captured image signal.

The digital signal processing unit 17 performs any one of interpolation processing and gain correction processing on the focus detecting pixel cell. The interpolation processing corrects an output signal of the focus detecting pixel cell using the output signals of imaging pixel cells around the focus detecting pixel cell, and the gain correction processing amplifies the output signal of the focus detecting pixel cell by multiplying by a gain to correct the output signal of the focus detecting pixel cell.

Figure 3:
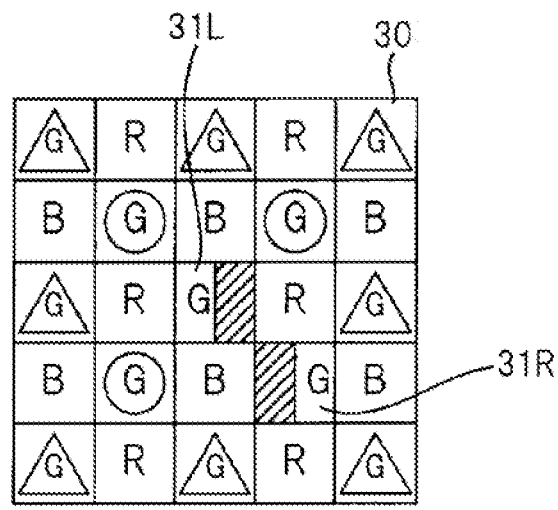
FIG. 3 is a view illustrating five by five pixel cells around a focus detecting pixel cell 31L in the solid-state imaging element 5.

FIG. 3 is a view obtained by extracting five by five pixel cells around a focus detecting pixel cell 31L in the solid-stage imaging element 5 illustrated in FIG. 2.

When the digital signal processing unit 17 corrects the output signal of the focus detecting pixel cell 31L by the interpolation processing, the digital signal processing unit 17 composes output signals of the imaging pixel cells 30 which detect light having the same color as the focus detecting pixel cell 31L, around the focus detecting pixel cell 31L, to generate one signal and substitutes the generated signal for the output signal of the focus detecting pixel cell 31L to perform correction.

For example, when the focus detecting pixel cell 31L illustrated in FIG. 3 is corrected by the interpolation processing, an output signal is obtained by averaging (includes simple averaging and weighted averaging) the output signals of the imaging pixel cells 30 enclosed by circles which detect the light having the same color as the focus detecting pixel cell 31L, around the focus detecting pixel cell 31L, and is substituted for the output signal of the focus detecting pixel cell 31L.

Further, when the focus detecting pixel cell 31L illustrated in FIG. 3 is corrected by the gain correction processing, for example, the digital signal processing unit 17 calculates a gain which makes the output signal of the focus detecting pixel cell 31L close to the average value of the output signals of the imaging pixel cells 30 enclosed by circles which detect the light having the same color as the focus detecting pixel cell 31L, around the focus detecting pixel cell 31L, to multiply the output signal of the focus detecting pixel cell 31L by the gain.

Meanwhile, when the focus detecting pixel cell 31L illustrated in FIG. 3 is corrected by the gain correction processing, the digital signal processing unit 17 may calculate a gain which makes the output signal of the focus detecting pixel cell 31L close to the average value of the output signals of the imaging pixel cells 30 enclosed by circles and triangles which detect the light having the same color as the focus detecting pixel cell 31L around the focus detecting pixel cell 31L to multiply the output signal of the focus detecting pixel cell 31L by the gain.

As described above, in the interpolation processing, the signal is interpolated using the output signals of the plurality of imaging pixel cells in a first range around the focus detecting pixel cell and in the gain correction processing, the gain for making the output signal of the focus detecting pixel cell close to the average of the output signals of the plurality of imaging pixel cells in a second range which is broader than the first range, around the focus detecting pixel cell, is multiplied by the output signal of the focus detecting pixel cell, so that a correction error by the gain correction processing may be reduced.

According to the interpolation processing, when the subject of which an image is formed around the focus detecting pixel cell is blurred, the correction error is small but when the subject is not blurred, the correction error is increased.

Further, the gain correction processing is processing which multiplies the output signal of the focus detecting pixel cell by the gain for making the output signal close to the output signals of the imaging pixel cells. Thus, when the difference of sensitivities between the focus detecting pixel cell and the imaging pixel cell is large and the gain is large, the noise which will be included in the output signal of the focus detecting pixel cell after being corrected is undesirably increased, which may increase the correction error.

The sensitivity difference between the focus detecting pixel cell and the imaging pixel cell is increased as an F value of the diaphragm 2 of the digital camera is decreased (as the diaphragm 2 is directed to the open state). This is because when the F value is small, a diameter of light which passes through the pupil region of the photographing lens 1 is increased, so that the phase difference detected by the two types of focus detecting pixel cells may be easily increased.

Further, as the F value of the diaphragm 2 is increased, a depth of field is increased. Therefore, as the F value is increased, a non-blurred region is increased in the subject. When there are lots of non-blurred regions in the subject, if the interpolation processing is performed, the correction error is increased.

That is, when the F value is large, in order to reduce the sensitivity difference and increase the depth of field, the gain correction processing is performed to reduce the correction error and when the F value is small, since the sensitivity difference is large and the depth of field is small, the interpolation processing is performed to reduce the correction error.

Therefore, the digital signal processing unit 17 selectively performs any one of the interpolation processing and the gain correction processing depending on the F value (referred to as an F value at the time of imaging) at a time when the imaging is performed to obtain the captured image signal. When the digital camera is a lens replaceable type, the F value at the time of imaging may have a fixed value depending on a lens to be mounted.

Figure 4:
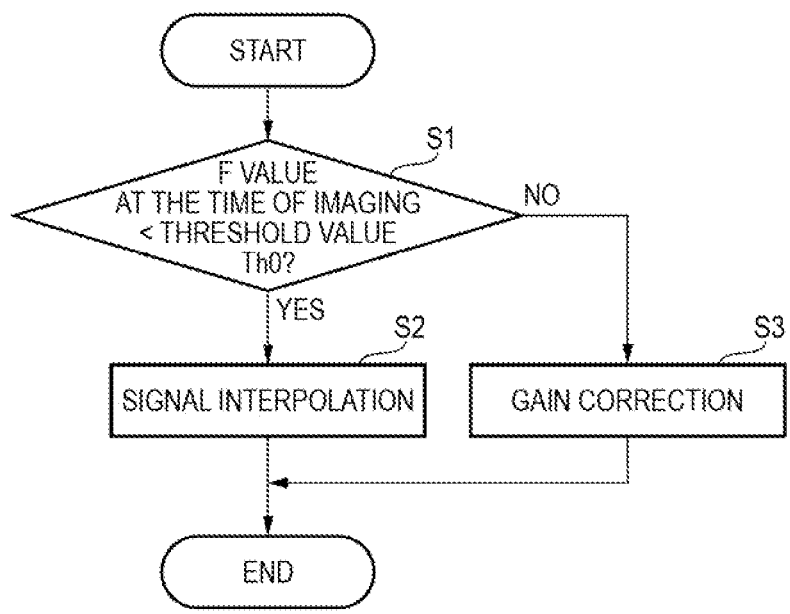
FIG. 4 is a flowchart explaining an operation in the digital camera illustrated in FIG. 1 when an output signal of an arbitrary focus detecting pixel cell is corrected.

FIG. 4 is a flowchart explaining an operation in the digital camera illustrated in FIG. 1 when an output signal of an arbitrary focus detecting pixel cell included in the solid-state imaging element 5 is corrected.

The digital signal processing unit 17 obtains information on the F value at the time of imaging from the system control unit 11 first, and compares the F value at the time of imaging with a threshold value Th0 in step S1.

When the F value at the time of imaging is smaller than the threshold value Th0 (Yes in step S1), the digital signal processing unit 17 corrects the output signal of the focus detecting pixel cell as a correcting target using the interpolation processing in step S2.

When the F value at the time of imaging is equal to or larger than the threshold value Th0 (No in step S1), the digital signal processing unit 17 corrects the output signal of the focus detecting pixel cell as a correcting target using the gain correction processing in step S3.

The digital signal processing unit 17 performs the operation on all the focus detecting pixel cells to complete the correction. Meanwhile, the threshold value Th0 may be determined in advance such that an amount of the correction error when all the focus detecting pixel cells are corrected becomes the smallest.

As described above, according to the digital camera illustrated in FIG. 1, since it is determined which one of the interpolation processing and the gain correction processing is to be performed in accordance with the F value at the time of imaging, an optimal correction with a smaller error may be performed. Therefore, a quality of the image captured by the solid-state imaging element including the focus detecting pixel cell and the imaging pixel cell may be improved.

In Patent Literature 1, when a variation of the output signals of the imaging pixel cells around the focus detecting pixel cell is large, a rate of the gain correction processing is increased and when the variation of the output signals is small, the rate of the interpolation processing is increased.

However, even though the variation of the output signals is large, when the sensitivity difference between the focus detecting pixel cell and the imaging pixel cell is large, if the gain correction processing is performed, the noise is undesirably increased, which may increase the correction error. Further, even though the variation of the output signals is small, when the sensitivity difference between the focus detecting pixel cell and the imaging pixel cell is small, the correction error in the gain correction processing may be smaller than that in the interpolation processing.

As described above, when the optimal correcting method is determined by the sensitivity difference between the focus detecting pixel cell and the imaging pixel cell, it is advantageous to improve the image quality. However, in Patent Literature 1, the correction processing is not switched by taking the sensitivity difference, that is, the F value at the time of imaging, into consideration, so that a sufficient image quality improvement may not be expected. On the contrary, according to the digital camera illustrated in FIG. 1, the correction processing is switched by taking the F value at the time of imaging into consideration, so that the image quality may be sufficiently improved.

Next, a modified exemplary embodiment of an operation of the digital signal processing unit 17 of the digital camera illustrated in FIG. 1 will be described.

(First Modified Exemplary Embodiment)

A focus detecting pixel cell 31L and a focus detecting pixel cell 31R have different structures so that there may be a difference in sensitivities in some cases. Therefore, a sensitivity difference between the focus detecting pixel cell 31L and an imaging pixel cell 30 and a sensitivity difference between the focus detecting pixel cell 31R and the imaging pixel cell 30 may not coincide but may be different from each other.

Therefore, in the present modified exemplary embodiment, a determination threshold value which is used to switch between interpolation processing and gain correction processing may vary depending on whether to correct an output signal of the focus detecting pixel cell 31L or an output signal of the focus detecting pixel cell 31R.

Figure 5:
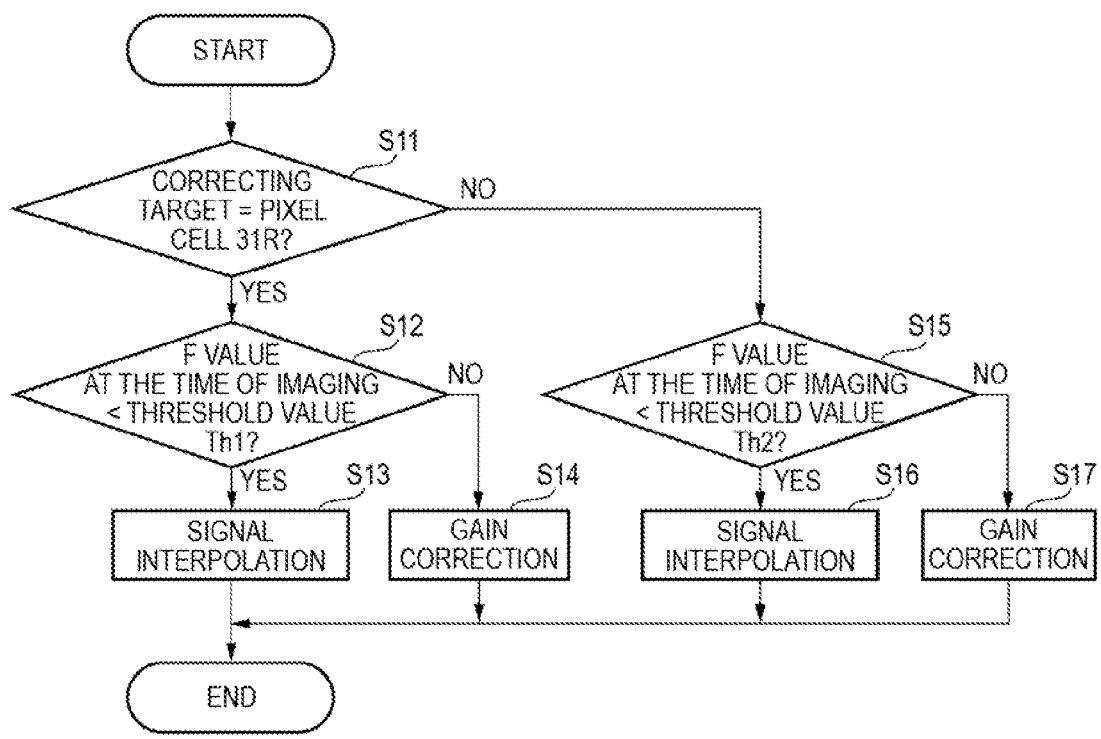
FIG. 5 is a flowchart explaining a first modified exemplary embodiment of an operation in the digital camera illustrated in FIG. 1 when an output signal of an arbitrary focus detecting pixel cell is corrected.

FIG. 5 is a flowchart explaining a first modified exemplary embodiment of an operation in the digital camera illustrated in FIG. 1 when an output signal of an arbitrary focus detecting pixel cell included in the solid-state imaging element 5 is corrected.

When a focus detecting pixel cell as a correcting target is a focus detecting pixel cell 31R (Yes in step S11), the digital signal processing unit 17 compares the F value at the time of imaging obtained from the system control unit 11 with a threshold value Th1 which is determined in advance to correspond to the focus detecting pixel cell 31R in step S12.

When the F value at the time of imaging is smaller than the threshold value Th1 (Yes in step S12), the digital signal processing unit 17 corrects an output signal of the focus detecting pixel cell 31R by the interpolation processing in step S13 and when the F value at the time of imaging is equal to or larger than the threshold value Th1 (No in step S12), the digital signal processing unit 17 corrects an output signal of the focus detecting pixel cell 31R by the gain correction processing in step S14.

When the focus detecting pixel cell as a correcting target is a focus detecting pixel cell 31L (No in step S11), the digital signal processing unit 17 compares the F value at the time of imaging obtained from the system control unit 11 with a threshold value Th2 which is determined in advance to correspond to the focus detecting pixel cell 31L in step S15. The threshold value Th2 is different from the threshold value Th1.

When the F value at the time of imaging is smaller than the threshold value Th2 (Yes in step S15), the digital signal processing unit 17 corrects an output signal of the focus detecting pixel cell 31L by the interpolation processing in step S16 and when the F value at the time of imaging is equal to or larger than the threshold value Th2 (No in step S15), the digital signal processing unit 17 corrects an output signal of the focus detecting pixel cell 31L by the gain correction processing in step S17.

As described above, different values are selected as the threshold value of the F value at the time of imaging to determine which one of the interpolation processing and the gain correction processing is to be performed depending on the type of the focus detecting pixel cell so that more precise correction may be performed.

Meanwhile, the sensitivity difference between the focus detecting pixel cell 31R and the focus detecting pixel cell 31L may be absorbed by a manufacturing allowable error from the point of view of the overall solid-state imaging element 5 to be almost unnoticeable. Therefore, as described in FIG. 4, even though the determination threshold values are the same for all focus detecting pixel cells, a sufficient image quality improving effect may be achieved.

In the above description, even though it is described that the solid state imaging element 5 has two types of focus detecting pixel cells, when a solid-state imaging element having three or more types of focus detecting pixel cells (for example, four types of focus detecting pixel cells which receive light passing through four divided regions of the pupil region of the photographing lens 1, that is, upper, lower, left, and right regions) is used, similarly, different determination threshold values may be determined in advance for every type of the focus detecting pixel cells so that the image quality may be improved.

(Second Modified Exemplary Embodiment)

A sensitivity difference between a focus detecting pixel cell and an imaging pixel cell may vary depending on a position on an imaging region where the focus detecting pixel cell is disposed, which will be described with reference to FIG. 6.

Figure 6:
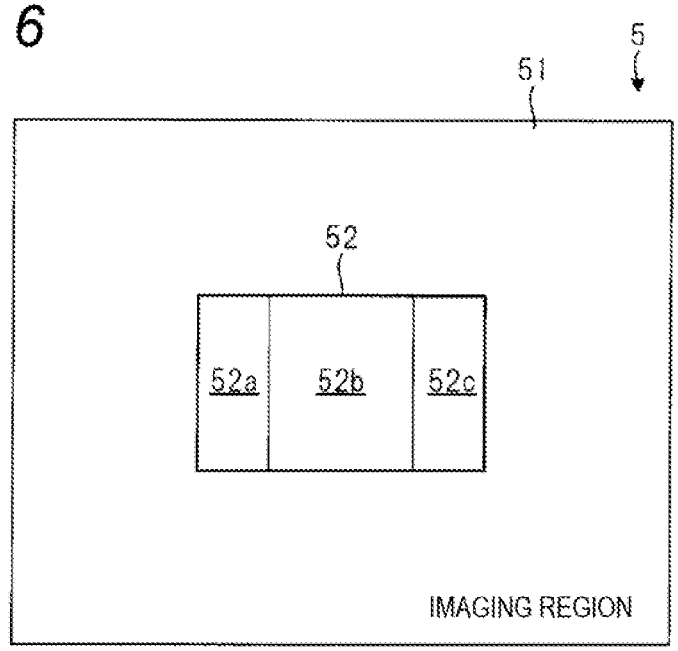
FIG. 6 is a schematic plan view illustrating an overall configuration of a solid-state imaging element 5 in the digital camera illustrated in FIG. 1.

FIG. 6 is a schematic plan view illustrating an overall configuration of a solid-state imaging element 5 in the digital camera illustrated in FIG. 1. In an example of FIG. 6, focus detecting pixel cells and imaging pixel cells are disposed in an AF region 52 which is located at a center portion of an imaging region 51 of the solid-state imaging element 5 in the same manner as in FIG. 2, and only the imaging pixel cells are disposed in the other regions.

The AF region 52 is divided into a region 52b where an incident angle (an angle with respect to a vertical line of a light receiving surface of the imaging region 51) of the light is reduced and regions 52a and 52c where incident angles are increased as compared with the region 52b.

Even at the same F value, in the region 52b and the regions 52a and 52c, the focus detecting pixel cells in the regions 52a and 52c have a larger incident angle, so that the phase difference may be easily caused. Therefore, the sensitivity difference between the focus detecting pixel cell and the imaging pixel cell may be increased.

Therefore, as compared with the focus detecting pixel cell in the region 52b, the interpolation processing may be caused to be easily performed in the focus detecting pixel cell in the regions 52a and 52c, so that the correction error may be reduced.

Therefore, in the present modified exemplary embodiment, the determination threshold value which is used to switch between the interpolation processing and the gain correction processing may vary depending on whether to correct the output signal of the focus detecting pixel cell in the region 52b and to correct the output signal of the focus detecting pixel cell in the regions 52a and 52c.

For example, the determination threshold value to correct the output signal of the focus detecting pixel cell in the region 52b is F2.8 and the determination threshold value to correct the output signal of the focus detecting pixel cell in the regions 52a and 52c is F3.0 which is larger than the determination threshold value to correct the output signal of the focus detecting pixel cell in the region 52b.

Figure 7:
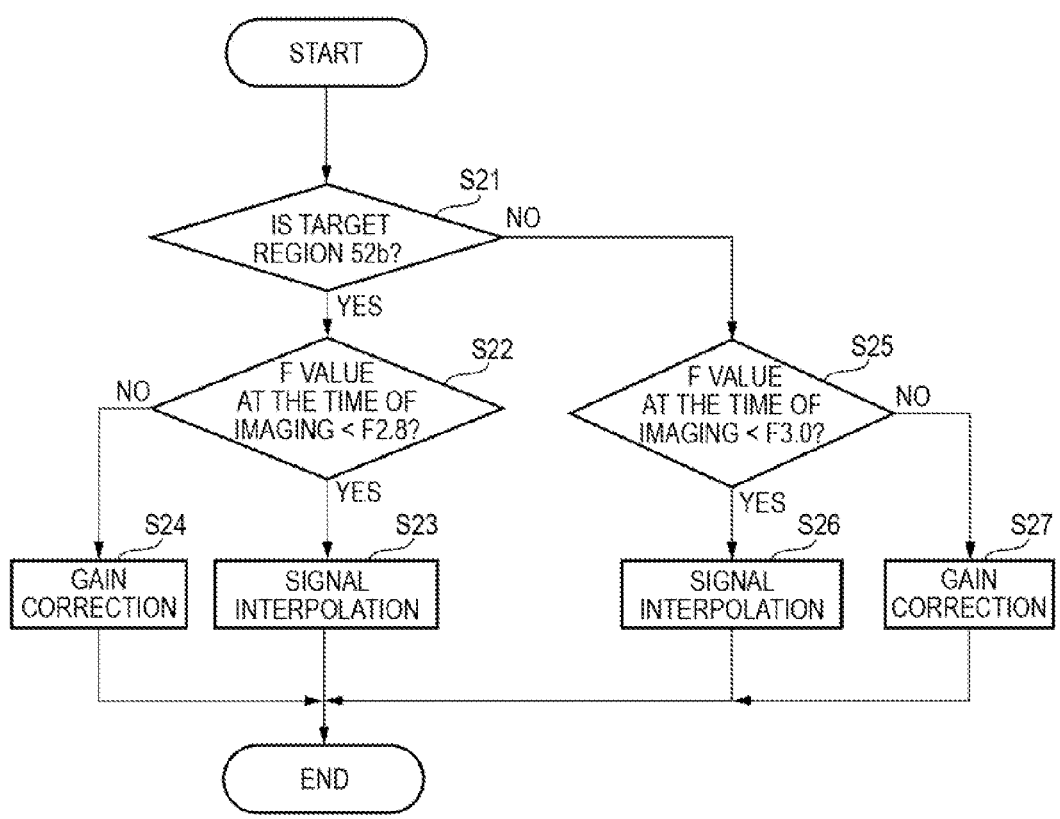
FIG. 7 is a flowchart explaining a second modified exemplary embodiment of an operation in the digital camera illustrated in FIG. 1 when an output signal of an arbitrary focus detecting pixel cell is corrected.

FIG. 7 is a flowchart explaining a second modified exemplary embodiment of an operation in the digital camera illustrated in FIG. 1 when an output signal of an arbitrary focus detecting pixel cell included in the solid-state imaging element 5 is corrected.

When a focus detecting pixel cell as a correcting target is disposed in the region 52b (Yes in step S21), the digital signal processing unit 17 performs processing subsequent to step S22 and when the focus detecting pixel cell as the correcting target is not disposed in the region 52b, but disposed in the regions 52a and 52c (No in step S21), the digital signal processing unit 17 performs processing subsequent to step S25.

In step S22, the digital signal processing unit 17 compares an F value at the time of imaging obtained from the system control unit 11 with a threshold value F2.8.

When the F value at the time of imaging is smaller than F2.8 (Yes in step S22), the digital signal processing unit 17 corrects an output signal of a focus detecting pixel cell which is a correcting target by interpolation processing in step S23 and when the F value at the time of imaging is equal to or larger than F2.8 (No in step S22), the digital signal processing unit 17 corrects the output signal of the focus detecting pixel cell which is a correcting target by gain correction processing in step S24.

Further, in step S25, the digital signal processing unit 17 compares an F value at the time of imaging obtained from the system control unit 11 with a threshold value F3.0.

When the F value at the time of imaging is smaller than F3.0 (Yes in step S25), the digital signal processing unit 17 corrects an output signal of a focus detecting pixel cell which is a correcting target by interpolation processing in step S26 and when the F value at the time of imaging is equal to or larger than F3.0 (No in step S25), the digital signal processing unit 17 corrects the output signal of the focus detecting pixel cell which is a correcting target by gain correction processing in step S27.

As described above, the determination threshold value is determined depending on a displacement position of the focus detecting pixel cell so that the captured image quality may be further improved.

(Third Modified Exemplary Embodiment)

A third modified exemplary embodiment is obtained by combining the second modified exemplary embodiment with the first modified exemplary embodiment.

Figure 8:
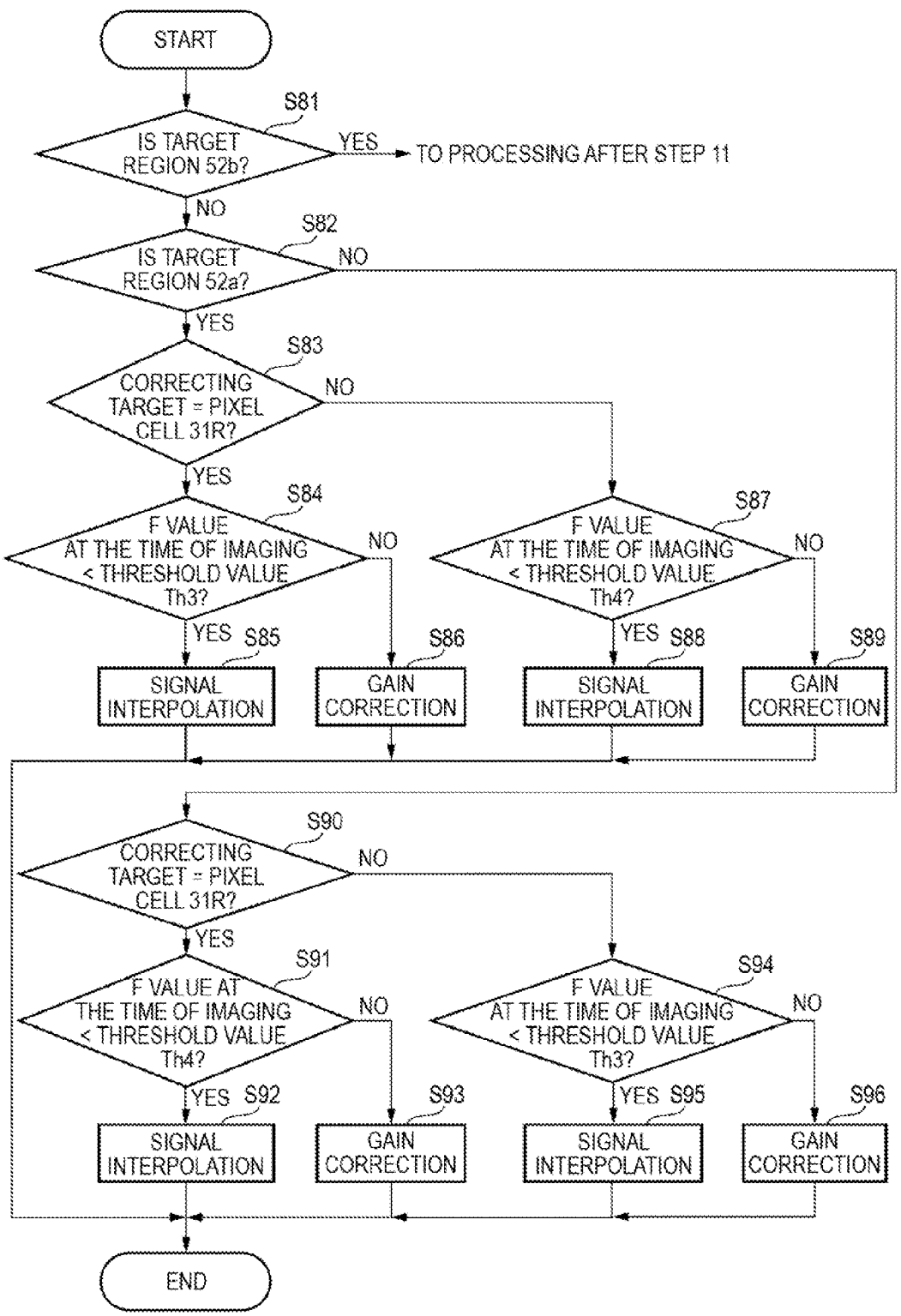
FIG. 8 is a flowchart explaining a third modified exemplary embodiment of an operation in the digital camera illustrated in FIG. 1 when an output signal of an arbitrary focus detecting pixel cell is corrected.

FIG. 8 is a flowchart explaining a third modified exemplary embodiment of an operation in the digital camera illustrated in FIG. 1 when an output signal of an arbitrary focus detecting pixel cell included in the solid-state imaging element 5 is corrected.

When the focus detecting pixel cell as the correcting target is disposed in the region 52b (Yes in step S81), the digital signal processing unit 17 performs processing subsequent to step S11 of FIG. 5. Further, when the focus detecting pixel cell as the correcting target is disposed in the region 52a or 52c (No in step S81), the digital signal processing unit 17 performs processing subsequent to step S82.

In step S82, when the focus detecting pixel cell as the correcting target is disposed in the region 52a (Yes in step S82), the digital signal processing unit 17 performs processing subsequent to step S83 and when the focus detecting pixel cell as the correcting target is disposed in the region 52c (No in step S82), the digital signal processing unit 17 performs processing subsequent to step S90.

In step S83, when the focus detecting pixel cell as the correcting target is a focus detecting pixel cell 31R (Yes in step S83), the digital signal processing unit 17 compares an F value at the time of imaging obtained from the system control unit 11 with a threshold value Th3 in step S84. The threshold value Th3 is larger than the threshold value Th1.

When the F value at the time of imaging is smaller than the threshold value Th3 (Yes in step S84), the digital signal processing unit 17 corrects an output signal of the focus detecting pixel cell 31R by the interpolation processing in step S85 and when the F value at the time of imaging is equal to or larger than the threshold value Th3 (No in step S84), the digital signal processing unit 17 corrects an output signal of the focus detecting pixel cell 31R by the gain correction processing in step S86.

In step S83, when the focus detecting pixel cell as the correcting target is a focus detecting pixel cell 31L (No in step S83), the digital signal processing unit 17 compares an F value at the time of imaging obtained from the system control unit 11 with a threshold value Th4 in step S87. The threshold value Th4 is different from the threshold value Th3 and larger than the threshold value Th2.

When the F value at the time of imaging is smaller than the threshold value Th4 (Yes in step S87), the digital signal processing unit 17 corrects an output signal of the focus detecting pixel cell 31L by the interpolation processing in step S88 and when the F value at the time of imaging is equal to or larger than the threshold value Th4 (No in step S87), the digital signal processing unit 17 corrects an output signal of the focus detecting pixel cell 31L by the gain correction processing in step S89.

In step S90, when the focus detecting pixel cell as the correcting target is a focus detecting pixel cell 31R (Yes in step S90), the digital signal processing unit 17 compares an F value at the time of imaging obtained from the system control unit 11 with the threshold value Th4 in step S91.

When the F value at the time of imaging is smaller than the threshold value Th4 (Yes in step S91), the digital signal processing unit 17 corrects an output signal of the focus detecting pixel cell 31R by the interpolation processing in step S92 and when the F value at the time of imaging is equal to or larger than the threshold value Th4 (No in step S91), the digital signal processing unit 17 corrects an output signal of the focus detecting pixel cell 31R by the gain correction processing in step S93.

In step S90, when the focus detecting pixel cell as the correcting target is a focus detecting pixel cell 31L (No in step S90), the digital signal processing unit 17 compares an F value at the time of imaging obtained from the system control unit 11 with the threshold value Th3 in step S94.

When the F value at the time of imaging is smaller than the threshold value Th3 (Yes in step S94), the digital signal processing unit 17 corrects an output signal of the focus detecting pixel cell 31L by the interpolation processing in step S95 and when the F value at the time of imaging is equal to or larger than the threshold value Th3 (No in step S94), the digital signal processing unit 17 corrects an output signal of the focus detecting pixel cell 31L by the gain correction processing in step S96.

As described above, the determination threshold value is changed not only depending on the position of the focus detecting pixel cell, but also depending on the type of the focus detecting pixel cell so that the correction may be performed with more precision.

Meanwhile, the determination threshold values in steps S84 and S91 and steps S87 and S94 of FIG. 8 are inversely set. This is because a sensitivity of the focus detecting pixel cell 31R is higher than that of the focus detecting pixel cell 31L in the region 52a but a sensitivity of the focus detecting pixel cell 31L is higher than that of the focus detecting pixel cell 31R in the region 52c.

(Fourth Modified Exemplary Embodiment)

A phase difference detected by focus detecting pixel cells varies depending on a focal distance of a photographing lens 1. Specifically, at the same F value, as the focal distance is longer, an aperture size of the photographing lens 1 is increased, so that a phase difference between two types of focus detecting pixel cells may be easily caused. That is, when the focal distance is long, a range of the F value where a sensitivity difference of the focus detecting pixel cell and the imaging pixel cell is tolerable to the gain correction processing is narrow as compared with a case when the focal distance is short.

Therefore, in the fourth modified exemplary embodiment, a threshold value used for determining in step S1 of FIG. 4 may be set to variable values depending on the focal distance (a focal distance at the time of imaging) at the time of photographing by the photographing lens 1.

For example, as illustrated in FIG. 9, a settable focal distance is divided into five ranges, so that the determination threshold value is set to be increased as the focal distance becomes longer. That is, as the focal distance is longer, the interpolation processing may be easily performed.

Since the determination threshold value is set as described above, for example, when the photography is performed at a telescopic side, the interpolation processing is performed in a wide range of F value at the time of imaging from a minimum value to F8.0. Therefore, as compared with a case where the determination threshold is fixed to F3.5, a rate of performing the interpolation process may be increased, so that the correction error is reduced to improve the image quality.

Meanwhile, also in the first to third modified exemplary embodiments, the determination value may be determined depending on the focal distance so that the same effect may be achieved.

(Fifth Modified Exemplary Embodiment)

In the present modified exemplary embodiment, the digital signal processing unit 17 calculates an average (hereinafter, referred to as an output average) of output signals of the imaging pixel cells around the focus detecting pixel cell as the correcting target and a flatness and determines which one of the interpolation processing and the gain correction processing is to be performed using the calculated output average and flatness, and the F value at the time of imaging.

Two types of determination condition data for determining which one of the interpolation processing and the gain correction processing is to be performed are stored in a memory 16 of the digital camera.

Figure 10A:
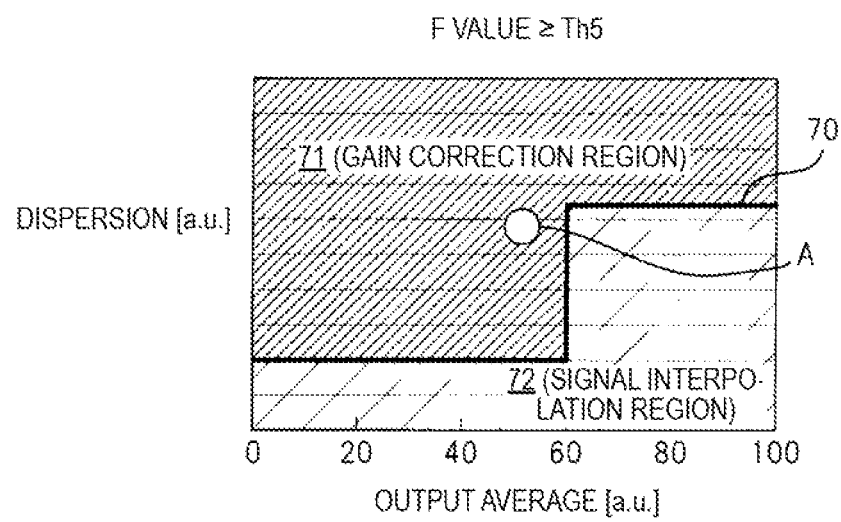
FIGS. 10A and 10B are views illustrating two types of determination condition data used in a fifth modified exemplary embodiment of the digital camera illustrated in FIG. 1.
Figure 10B:
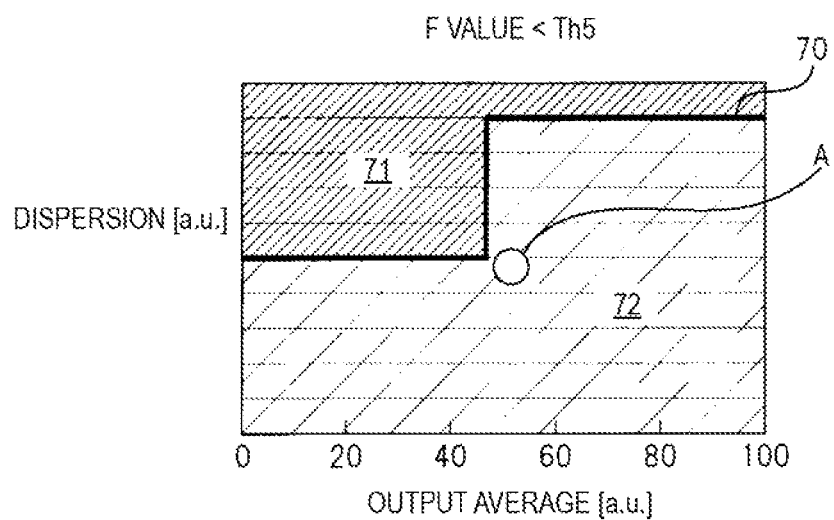

FIGS. 10A and 10B are views explaining two types of determination condition data. In FIGS. 10A and 10B, graphs representing an output average on a horizontal axis and a dispersion as a flatness on a vertical axis are illustrated.

In FIGS. 10A and 10B, determination lines 70 are represented and shapes and positions of the determination lines 70 are different in FIGS. 10A and 10B.

In FIGS. 10A and 10B, in a region enclosed by the vertical axis and the horizontal axis, a region above the determination line 70, which includes the determination line 70, is assumed as a gain correcting region 71 and a region below the determination line 70 is assumed as a signal interpolating region 72.

When the calculated dispersion and the calculated output average are included in the gain correcting region 71 (satisfy a first condition), the digital signal processing unit 17 performs the gain correction processing and when the dispersion and the output average are included in the signal interpolating region 72 (satisfy a second condition), the digital signal processing unit 17 performs the interpolation processing. As described above, the determination condition data exemplified in FIG. 10A or 10B is data which defines a combination of the first condition with the second condition.

The determination condition data is stored in the memory 16 to correspond to each of two divided ranges of a range of an F value which may be set in the digital camera. For example, when an F value (this F value is referred to as a threshold value Th5) at a border between the two divided ranges of the range of the F value is assumed as F2.8, the data of FIG. 10A is determined to correspond to a range where the F value is equal to or larger than F2.8. Further, the data of FIG. 10B is determined to correspond to a range where the F value is smaller than F2.8.

The digital signal processing unit 17 determines correction processing to be performed in accordance with the determination condition data corresponding to the F value at the time of imaging. For example, when the F value at the time of imaging is equal to or larger than the threshold value Th5, the digital signal processing unit 17 determines correction processing to be performed in accordance with the data illustrated in FIG. 10A and when the F value at the time of imaging is smaller than the threshold value Th5, the digital signal processing unit 17 determines correction processing to be performed in accordance with the data illustrated in FIG. 10B.

As described in the first to fourth modified exemplary embodiments, the threshold value Th5 may be set to vary depending on a type of a focus detecting pixel cell, a position thereof, and a focal distance of the photographing lens 1.

A large output average means that a gain used in the gain correction processing is increased. As the gain is increased, amplification of the noise is also increased, so that the correction error by the gain correction processing is increased. Therefore, when the output average is large, the interpolation processing is desirable and when the output average is small, the gain correction processing is desirable.

Further, when the dispersion is large, it is assumed that there is a subject having a high sharpness near the focus detecting pixel cell. Thus, when the signal interpolation processing is performed, the correction error is increased. Therefore, when the dispersion is large, the gain correction processing is desirable and when the dispersion is small, the interpolation processing is desirable.

However, even when the output average is large, if the dispersion is very large, the gain correction processing may reduce the correction error rather than the interpolation processing. Further, even when the dispersion is small, if the output average is small, the gain correction processing may reduce the correction error rather than the interpolation processing.

By taking the above facts into consideration, in the data illustrated in FIGS. 10A and 10B, the determination line 70 is set such that the correction error is minimized.

Further, the determination line 70 which may minimize the correction error may vary depending on the F value of the diaphragm 2 in the photographing lens 1. For example, when the F value is increased, the sensitivity difference between the focus detecting pixel cell and the imaging pixel cell is reduced and a gain in the gain correction processing is reduced, so that the correction error tends to be reduced in the gain correction processing. Further, when the F value is increased, since the depth of field is increased to increase a sharpness of the subject, the correction error by the interpolation processing tends to be increased.

That is, as the F value is increased, it is desirable that the gain correction processing is easily performed rather than the interpolation processing. As for two types of data illustrated in FIGS. 10A and 10B, FIG. 10A corresponds to a case when an F value is equal to or larger than the threshold value Th5 and FIG. 10B corresponds to a case when an F value is smaller than the threshold value Th5. When the two types of data are compared to each other, it is understood that as the F value is increased, the gain correction processing may be easily performed rather than the interpolation processing.

As described above, two types of determination condition data for determining which one of the interpolation processing and the gain correction processing is to be performed are prepared and it is determined to use which one of the two types of data by the F value at the time of imaging, so that the correction error may be reduced to be minimum, which may improve a captured image quality.

Here, the two types of determination condition data are used, but three or more types of data may be used.

In this case, the determination condition data indicating a combination of the gain correction region and the signal interpolating region as illustrated in FIGS. 10A and 10B is stored in the memory 16 so as to correspond to each of three or more divided ranges of the range of an F value which may be set in the digital camera. The digital signal processing unit 17 determines which correction processing is to be performed in accordance with the data corresponding to the divided range including the F value at the time of imaging.

(Sixth Modified Exemplary Embodiment)

In this modified exemplary embodiment, another example of the data illustrated in FIGS. 10A and 10B will be described.

Figure 11A:
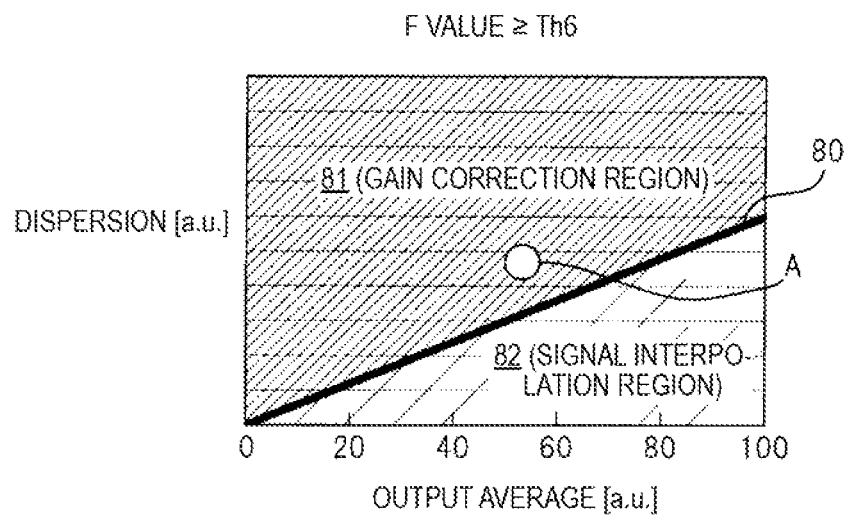
FIGS. 11A and 11B are views illustrating a modified exemplary embodiment of data illustrated in FIGS. 10A and 10B.
Figure 11B:
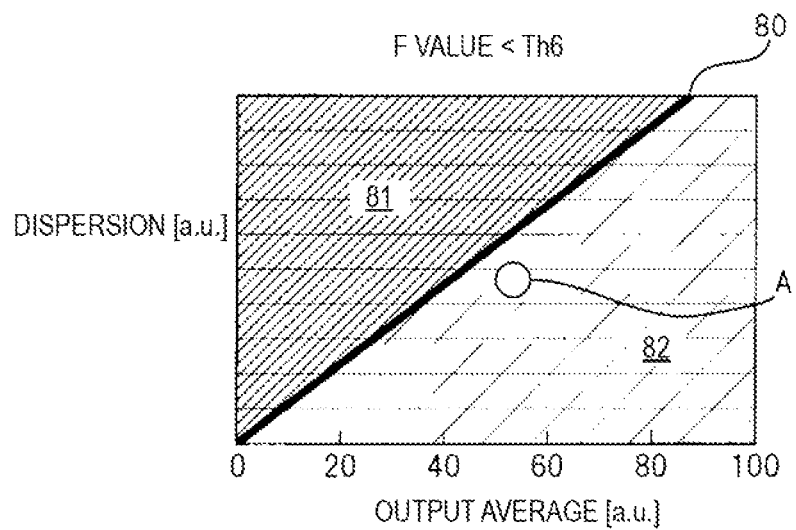

In FIGS. 11A and 11B, graphs representing an output average on a horizontal axis and a dispersion on a vertical axis are illustrated. In FIGS. 11A and 11B, a determination line 80 which is represented by Y=kX (when an output average is X and a dispersion is Y) is illustrated. Values of k in the determination line 80 are different from each other in FIGS. 11A and 11B.

In FIGS. 11A and 11B, in a region enclosed by the vertical axis and the horizontal axis, a region above the determination line 80, which includes the determination line 80, is assumed as a gain correcting region 81 and a region below the determination line 80 is assumed as a signal interpolating region 82.

When a point (for example, a point A in the drawings) obtained by plotting the calculated output average and dispersion on the graphs of FIGS. 11A and 11B is in the gain correcting region 81, the digital signal processing unit 17 performs the gain correction processing and when the point is in the signal interpolating region 82, the digital signal processing unit 17 performs the interpolation processing.

That is, when a gradient of a straight line connecting the point (for example, a point A in the drawings) obtained by plotting the calculated output average and dispersion on the graphs of FIGS. 11A and 11B to an origin point is equal to or larger than a gradient k of the determination line 80, the digital signal processing unit 17 performs the gain correction processing and when the gradient of the straight line is smaller than the gradient k of the determination line 80, the digital signal processing unit 17 performs the interpolation processing.

Data of FIG. 11A is determined to correspond to a range where the F value is equal to or larger than a threshold value Th6 and data of FIG. 11B is determined to correspond to a range where the F value is smaller than the threshold value Th6.

As described in the first to fourth modified exemplary embodiments, the threshold value Th6 may be set to vary depending on a type of a focus detecting pixel cell, a position thereof, and a focal distance of the photographing lens 1.

As described also in the fifth modified exemplary embodiment, it is desirable that the gain correction processing is easily performed as compared with the interpolation processing as the F value is increased. Therefore, the k value may be reduced as the corresponding F value is increased.

As described above, the correction error may be minimized by using the determination condition data illustrated in FIGS. 11A and 11B, so that the captured imaging quality may be improved.

Meanwhile, three or more types of the determination condition data may be used also in the present modified exemplary embodiment.

(Seventh Modified Exemplary Embodiment)

Another example of a configuration of the solid-state imaging element 5 illustrated in FIG. 2 will be described in the present modified exemplary embodiment.

Figure 12:
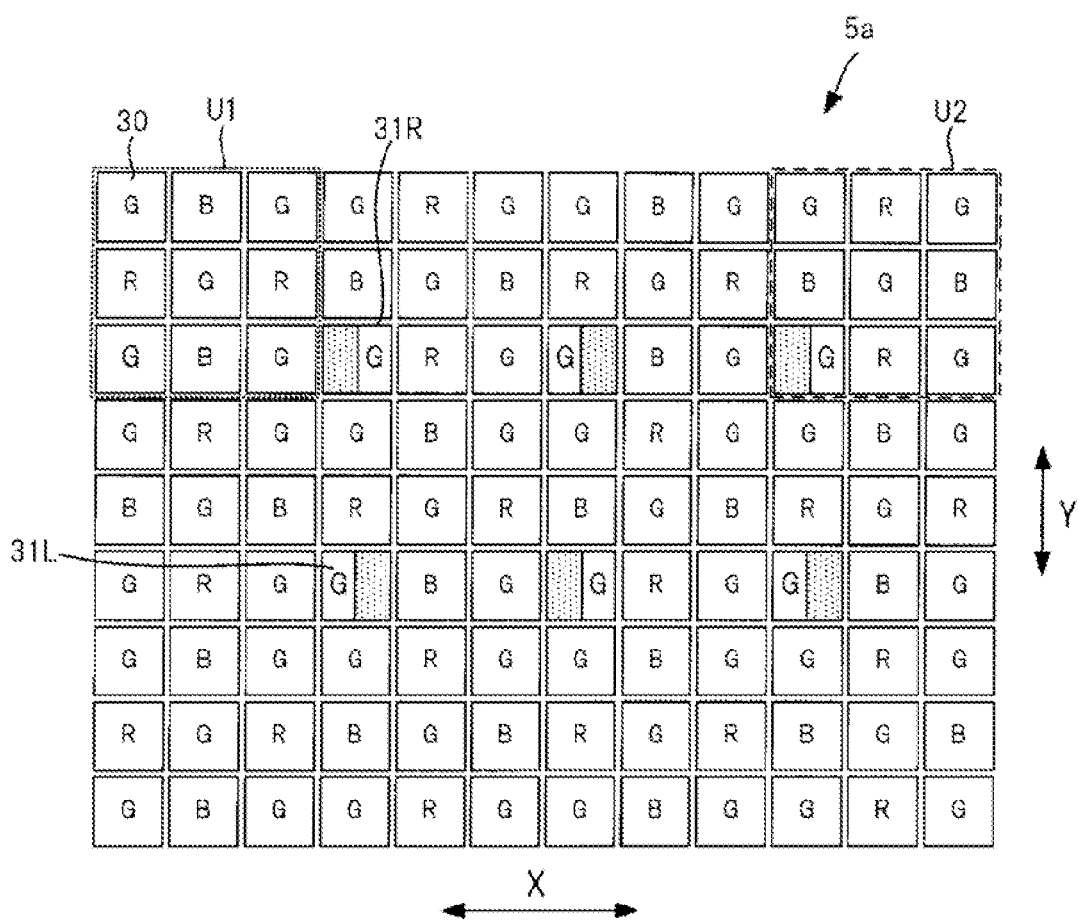
FIG. 12 is a schematic plan view illustrating a solid-state imaging element 5a which is a modified exemplary embodiment of a solid-state imaging element 5 which is mounted in the digital camera illustrated in FIG. 1.

FIG. 12 is a schematic plan view illustrating a solid-state imaging element 5a which is a modified exemplary embodiment of a solid-state imaging element 5 which is mounted in the digital camera illustrated in FIG. 1. In the solid-state imaging element 5a, an arrangement of color filters mounted in respective pixel cells is different from that in FIG. 2. The color filters mounted in the pixel cells of the solid-state imaging element 5a are arranged such that a ratio of the number of R filters, the number of B filters, and the number of G filters becomes 1:1:2.5.

The arrangement of the color filters mounted in the solid-state imaging element 5a is formed such that a filter arrangement in a unit U1 illustrated in FIG. 12 and a filter arrangement in a unit U2 where positions of R filters and positions of B filters are switched from those in the filter arrangement of the unit U1 are arranged in a checkerboard pattern.

That is, the unit U1 and the unit U2 are alternately disposed to be arranged in horizontal and vertical directions.

In the unit U1, G filters which are brightness filters are disposed at four corners and a center. Further, in the unit U1, R filters are disposed at both sides of the center G filter in a row direction X and B filters are disposed at both sides of the center G filter in a column direction Y.

In the unit U2, the positions of the R filters and the B filters are switched from those in the unit U1.

Further, the G filters at the four corners of each of the units U1 and U2 have an arrangement including a square arrangement of G filters of two by two pixels because the units U1 and the units U2 are alternately arranged in the horizontal and vertical directions.

The color filter arrangement of the solid-state imaging element 5a has, as a basic arrangement pattern, a filter arrangement of six by six matrix in which two units U1 and two units U2 are alternately arranged in the horizontal and vertical directions and the basic arrangement patterns are repeated.

In the color filter arrangement as described above, first filters (G filters) corresponding to a first color G which most contributes to obtaining a brightness signal are arranged in each line in horizontal, vertical, and oblique directions of the color filter arrangement. Further, a rate of a pixel number of the first color corresponding to the first filter is larger than a rate of a pixel number of second colors B and R corresponding to two colors B and R of second filters (B filter and R filter) other than the first color. By employing the above arrangement, a reproduction precision of concurrent processing in a high frequency region may be improved and aliasing may be suppressed.

Further, one or more second filters (B filter and R filter) corresponding to the second colors B and R are arranged in each line in the horizontal and vertical directions of the color filter arrangement in the basic arrangement pattern, so that color moiré is suppressed to achieve high resolution.

Moreover, in the color filter arrangement, predetermined basic arrangement patterns are repeated in the horizontal direction and the vertical direction, so that the concurrent (interpolation) processing is performed in accordance with the repeated patterns at a later stage. Therefore, the processing at the later stage may be simplified as compared with a conventional random arrangement.

In the solid-state imaging element 5a mounted with the color filters having the above arrangement, a part of pixel cells mounted with the G filters serves as focus detecting pixel cells 31L and 31R.

The above-described correction processing is also performed on the solid-state imaging element 5a so that a captured image quality may be improved.

(Eighth Modified Exemplary Embodiment)

In the present modified exemplary embodiment, descriptions will be made on a configuration of a smart phone as an imaging device.

Figure 13:
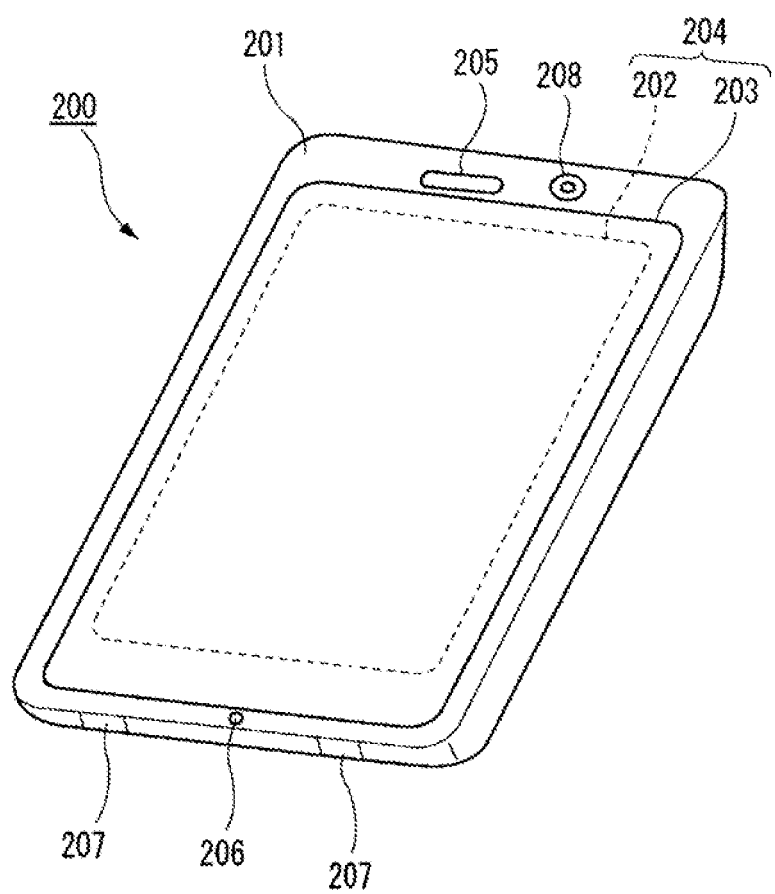
FIG. 13 is a view illustrating a smart phone as an imaging device.

FIG. 13 illustrates an outer appearance of a smart phone 200 which is an exemplary embodiment of a photographing device of the present invention. The smart phone 200 illustrated in FIG. 13 includes a flat panel type housing 201 and is provided with a display input unit 204 on one surface of the housing 201. The display input unit 204 includes a display panel 202 as a display unit, and an operating panel 203 as an input unit which are integrated. In addition, the housing 201 includes a speaker 205, a microphone 206, an operating unit 207, and a camera 208. However, the configuration of the housing 201 is not limited thereto. For example, a configuration in which the display unit and the input unit are independent from each other may be employed or a configuration having a folding structure or a slide mechanism may be employed.

Figure 14:
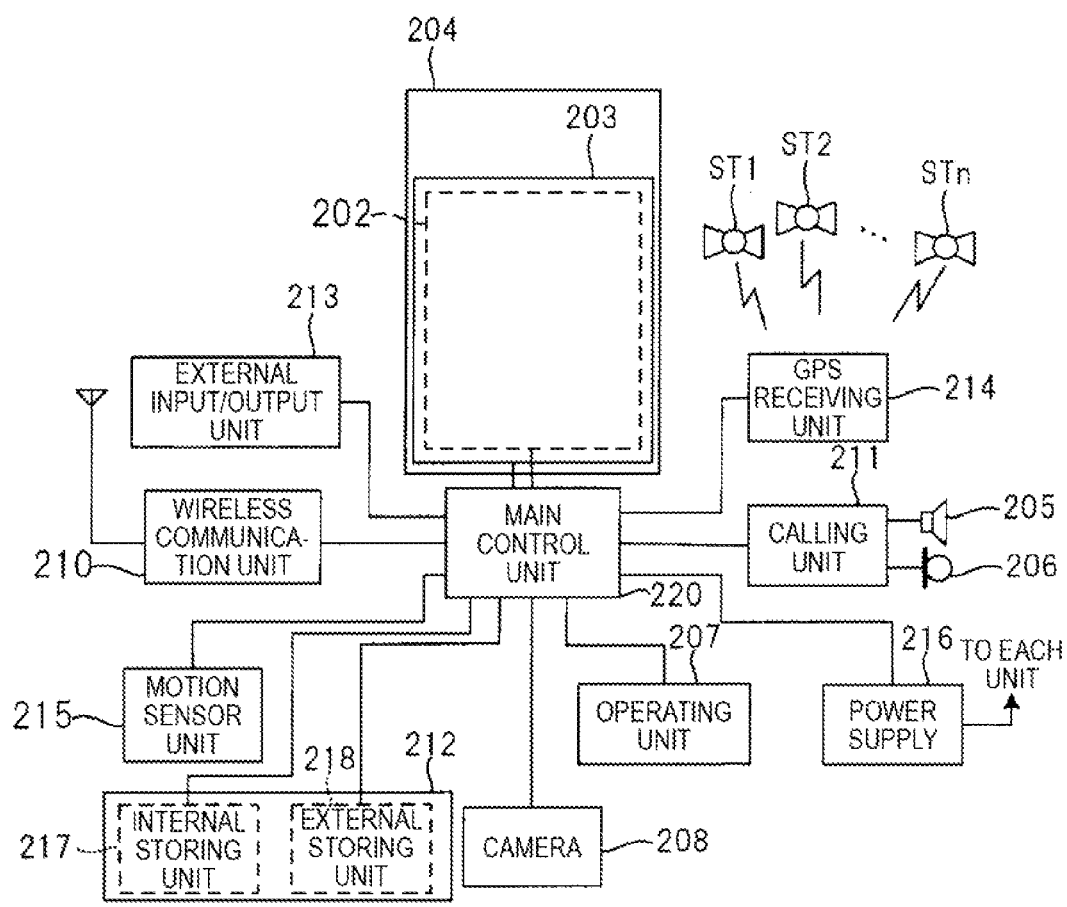
FIG. 14 is an internal block diagram of the smart phone of FIG. 13.

FIG. 14 is a block diagram illustrating a configuration of the smart phone 200 illustrated in FIG. 13. As illustrated in FIG. 14, as main components, the smart phone includes a wireless communication unit 210, a display input unit 204, a calling unit 211, an operating unit 207, a camera 208, a storing unit 212, an external input/output unit 213, a global positioning system (GPS) receiving unit 214, a motion sensor unit 215, a power supply 216, and a main control unit 220. Further, the smart phone 200 has, as a main function, a wireless communication function which performs mobile wireless communication through a base station device BS (not illustrated) and a mobile communication network NW (not illustrated).

The wireless communication unit 210 performs wireless communication with the base station device BS which is accommodated in the mobile communication network NW in accordance with an instruction of the main control unit 220. Using the wireless communication, the wireless communication unit 210 transmits/receives various file data such as voice data and image data and electronic mail data or receives, for example, web data, or streaming data.

The display input unit 204 is a so-called touch panel which displays an image (a still image or a moving picture) or text information under the control of the main control unit 220 so as to visually transmit information to a user, and detects the user's operation on displayed information. The display input unit 204 is provided with the display panel 202 and the operating panel 203

The display panel 202 uses, for example, a liquid crystal display (LCD) or an organic electroluminescence display (OELD) as a display device.

The operating panel 203 is a device which is mounted to allow an image displayed on a display surface of the display panel 202 to be visually recognized and detects one or more coordinates operated by a finger of the user or a stylus. When the device is operated by the finger of the user or the stylus, a detection signal which is generated based on the operation is output to the main control unit 220. Subsequently, the main control unit 220 detects an operating position (coordinate) on the display panel 202, based on the received detection signal.

As illustrated in FIG. 13, the display panel 202 and the operating panel 203 of the smart phone 200 exemplified as an exemplary embodiment of the photographing device of the present invention are integrated with each other to constitute the display input unit 204, in which the operating panel 203 may be disposed to completely cover the display panel 202.

When such an arrangement is employed, the operating panel 203 may have a function of detecting the user's operation on a region other than the display panel 202. That is, the operating panel 203 may include a detection region (hereinafter, referred to as a "display region") on an overlapping portion which overlaps the display panel 202 and a detection region (hereinafter, referred to as a "non-display region") for the outer peripheral portion which does not overlap the display panel 202.

Meanwhile, the size of the display region and the size of the display panel 202 may completely coincide with each other, but do not have to necessarily coincide with each other. In addition, the operating panel 203 may include two sensitive regions of an outer peripheral portion and an inner portion other than the outer peripheral portion. Moreover, a width of the outer peripheral portion is appropriately designed in accordance with the size of the housing 201. Moreover, as a position detecting system employed in the operating panel 203, a matrix switch system, a resistive layer system, a surface elastic wave system, an infrared system, an electromagnetic induction system, or an electrostatic capacitive system may be exemplified, and any system may be employed.

The calling unit 211 includes the speaker 205 or the microphone 206 and converts the user's voice input through the microphone 206 into voice data to be processed by the main control unit 220 and outputs the converted voice data to the main control unit 220, or decodes voice data received by the wireless communication unit 210 or the external input/output unit 213 and outputs the decoded voice data from the speaker 205. Furthermore, as illustrated in FIG. 13, for example, the speaker 205 may be mounted on the same surface as the surface provided with the display input unit 204 and the microphone 206 may be mounted on a side surface of the housing 201.

The operating unit 207 is a hardware key which uses a key switch and receives an instruction from the user. For example, as illustrated in FIG. 13, the operating unit 207 is a push button type switch which is mounted on a side surface of the housing 201 of the smart phone 200. The operating unit 207 is turned on by being pressed by a finger and turned off by a restoring force of a spring when the finger is released.

The storing unit 212 stores a control program or control data of the main control unit 220, application software, address data corresponding to, for example, names or phone numbers of communication counterparts, transmitted/received electronic mail data, web data downloaded by web browsing or downloaded content data, and temporarily stores streaming data. Further, the storing unit 212 is constituted by an internal storing unit 217 embedded in the smart phone and an external storing unit 218 which includes a detachable external memory slot. Furthermore, each of the internal storing unit 217 and the external storing unit 218 which constitute the storing unit 212 is implemented by using a storing medium such as a flash memory type memory, a hard disk type memory, a multimedia card micro type memory, a card type memory (for example, MicroSD (registered trademark) memory), a random access memory (RAM), or a read only memory (ROM).

The external input/output unit 213 functions as an interface with all external devices connected to the smart phone 200 and is configured to be directly or indirectly connected to any other external device by communication (for example, universal serial bus (USB) or IEEE1394) or a network (for example, Internet, wireless LAN, Bluetooth (registered trademark), a radio frequency identification (RFID), an infrared data association (IrDA (registered trademark)), ultra wideband (UWB: registered trademark), or a ZigBee (registered trademark).

As external devices connected to the smart phone 200, a wired/wireless head set, a wired/wireless external charger, a wired/wireless data port, a memory card or a SIM (subscriber identity module) card/UIM (user identity module) card connected through a card socket, an external audio/video device connected through an audio/video input/output (I/O) terminal, a wirelessly connected external audio/video device, a wiredly/wirelessly connected smart phone, a wiredly/wirelessly connected personal computer, a wiredly/wirelessly connected PDA, a wiredly/wirelessly connected personal computer, or an earphone may be exemplified. The external input/output unit 213 may transmit data received from such external devices to individual components in the smart phone 200 and may also allow the data in the smart phone 200 to be transmitted to the external devices.

The GPS receiving unit 214 receives GPS signals transmitted from GPS satellites ST1 to STn according to an instruction from the main control unit 220 and performs position measurement operation processing based on the received GPS signals to detect a location of the smart phone 200 which is constituted by a latitude, a longitude, and an altitude. When the GPS receiving unit 214 may obtain location information from the wireless communication unit 210 or the external input/output unit 213 (for example, the wireless LAN), the GPS receiving unit 214 may detect a location using the location information.

The motion sensor unit 215 includes, for example, a three axis acceleration sensor and detects physical movement of the smart phone 200 according to the instruction of the main control unit 220. When the physical movement of the smart phone 200 is detected, the movement direction or acceleration of the smart phone 200 is detected. The detected result is output to the main control unit 220.

The power supply 216 supplies power accumulated in a battery (not illustrated) to individual units of the smart phone 200 according to the instruction of the main control unit 220.

The main control unit 220 includes a microprocessor and operates according to a control program or control data stored in the storing unit 212 to collectively control individual units of the smart phone 200. Further, the main control unit 220 is provided with a mobile communication control function for controlling individual units of a communication system and an application processing function in order to perform voice communication or data communication through the wireless communication unit 210.

The application processing function is implemented when the main control unit 220 is operated according to the application software stored in the storing unit 212. The application processing function includes, for example, an infrared communication function which performs data communication with a counterpart device by controlling the external input/output unit 213, an electronic mail function which transmits/receives an electronic mail, and a web browsing function which browses a web page.

Further, the main control unit 220 is provided with an image processing function which displays an image on the display input unit 204 based on the image data (still image or moving picture data) of received data or downloaded streaming data. The image processing function refers to a function of decoding the image data and performing image processing on the decoded result to display the image on the display input unit 204 by the main control unit 220.

Moreover, the main control unit 220 executes display control of the display panel 202 and an operation detection control which detects a user's operation through the operating unit 207 and the operating panel 203. By executing the display control, the main control unit 220 displays an icon to activate application software or a software key such as a scroll bar or displays a window for preparing an electronic mail. Here, the scroll bar refers to a software key for receiving an instruction to move a displayed portion of an image with respect to a large image which cannot be included in the display region of the display panel 202.

In addition, when the operation detection control is executed, the main control unit 220 detects the user's operation through the operating unit 207, receives an operation on the icon or the input of a character string of an input section of the window through the operating panel 203 or receives a scroll request of a displayed image through the scroll bar.

Furthermore, the main control unit 220 has a touch panel control function, so that when the operation detection control is executed, the main control unit 220 determines whether the operating position of the operating panel 203 is an overlapping portion (display region) which overlaps the display panel 202 or an outer peripheral portion (non-display region) which does not overlap the display panel 202 other than the overlapping portion and controls a sensitive region of the operating panel 203 or a display position of the software key.

Further, the main control unit 220 may detect a gesture operation with respect to the operating panel 203 and execute a predetermined function according to the detected gesture operation. The gesture operation refers to an operation of drawing a trace using a finger, an operation of designating a plurality of positions simultaneously, or an operation of combining these two operations to draw a trace for at least one from the plurality of positions, rather than a conventional simple touch operation.

The camera 208 includes a configuration other than the external memory control unit 20, the recording medium 21, the display control unit 22, the display unit 23, and the operating unit 14 in the digital camera which is illustrated in FIG. 1. Captured image data which is generated by the camera 208 may be stored in the storing unit 212 or output through the external input/output unit 213 or the wireless communication unit 210. As illustrated in FIG. 13, although the camera 208 is mounted on the same surface as the display input unit 204 in the smart phone 200, the mounting position of the camera 208 is not limited thereto and the camera 208 may be mounted on a rear surface of the display input unit 204.

Further, the camera 208 may be used for various functions of the smart phone 200. For example, an image which is obtained by the camera 208 may be displayed on the display panel 202, or the image of the camera 208 may be used as one of operation inputs of the operating panel 203. Further, when the GPS receiving unit 214 detects the location, the location may be detected with reference to the image from the camera 208. Moreover, an optical axis direction of the camera 208 of the smart phone 200 may be determined or a current usage environment may also be determined with reference to the image from the camera 208 either without using the 3-axis acceleration sensor or using the 3-axis acceleration sensor. Of course, the image from the camera 208 may be used in the application software.

In addition, location information obtained by the GPS receiving unit 214, voice information obtained by the microphone 206 (which may be converted into text information through a voice-text conversion by, for example, the main control unit), or posture information obtained by the motion sensor unit 215 may be added to the image data of a still image or a moving picture to be stored in the storing unit 212 or output through the external input/output unit 213 or the wireless communication unit 210.

Also in the smart phone 200 having the above-described configuration, the captured image quality may be improved by the above-described correction processing.

In the above description, even though the pixel cell mounted with a G filter serves as the focus detecting pixel cell, the pixel cell mounted with an R filter or the pixel cell mounted with a B filter may serve as the focus detecting pixel cell. However, the number of pixel cells mounted with the G filters is larger than the number of pixel cells mounted with other filters, so that the interpolation processing may be performed with better precision.

Even though it has been described that the photographing optical system is fixed to the digital camera illustrated in FIG. 1, the photographing optical system may be detachably provided. In the digital camera including the detachable photographing optical system, a range of the F value to be set is broadened as much as the types of photographing optical systems to be mounted, so that as described above, when it is determined which one of the interpolation processing and the gain correction processing is to be performed using at least the F value at the time of imaging, it is specifically effective to improve an image quality.

As described above, the following matters are disclosed herein.

It is disclosed a signal processing apparatus for processing a signal from an imaging element, the imaging element including a plurality of first pixel cells for imaging and a plurality of second pixel cells for focus detection which are two dimensionally arranged and imaging a subject through an optical system, the signal processing apparatus comprising: a correction processing unit which performs one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell, wherein the correction processing unit determines which one of the first correction processing and the second correction processing is to be performed using at least an F value at the time of imaging which is an F value of a diaphragm included in the optical system at the time of imaging to obtain a signal to be corrected.

It is disclosed the signal processing apparatus, further comprising: an average calculating unit which calculates an average of the output signals of the first pixel cells around the second pixel cell; and a flatness calculating unit which calculates a flatness of the output signals of the first pixel cells around the second pixel cell, wherein the correction processing unit determines which one of the first correction processing and the second correction processing is to be performed using the average, the flatness, and the F value at the time of imaging.

It is disclosed the signal processing apparatus, wherein the flatness is a dispersion, when the dispersion and the average satisfy a first condition, the correction processing unit performs the first correction processing, when the dispersion and the average satisfy a second condition, the correction processing unit performs the second correction processing, and the signal processing apparatus further includes a storing unit which stores a plurality of types of combinations of the first condition and the second condition, the plurality of types of combinations being determined to correspond to divided ranges of an settable range of the F value, and the correction processing unit selectively uses one of the plurality of types of combinations corresponding to one of the divided ranges which includes the F value at the time of imaging.

It is disclosed the signal processing apparatus, wherein a graph has the average on a first axis and the dispersion on a second axis, the first condition is a condition where in the graph, a gradient of a straight line connecting a point obtained by plotting the average and the dispersion to an origin point is smaller than a predetermined threshold gradient, the second condition is a condition where in the graph, the gradient of the straight line is equal to or larger than the threshold gradient, and the plurality of types of combinations have different threshold gradients.

It is disclosed the signal processing apparatus, wherein the second pixel cells include a plurality of types of pixel cells which receives a plurality of light fluxes passing through different pupil regions of the optical system, and an F value which becomes a border of the divided ranges varies depending on the plurality of types of pixel cells.

It is disclosed the signal processing apparatus, wherein the F value which becomes a border of the divided ranges is variably determined in accordance with the positions of the second pixel cells in a region where the first pixel cells and the second pixel cells are two dimensionally arranged.

It is disclosed the signal processing apparatus, wherein the F value which becomes a border of the divided ranges is variably determined in accordance with a focal distance of the optical system.

It is disclosed the signal processing apparatus, wherein when the F value at the time of imaging is smaller than a predetermined first threshold value, the correction processing unit performs the first correction processing, and when the F value at the time of imaging is equal to or larger than the first threshold value, the correction processing unit performs the second correction processing.

It is disclosed the signal processing apparatus, wherein the second pixel cells include a plurality of types of pixel cells which receives a plurality of light fluxes passing through different pupil regions of the optical system, and the first threshold value is variably determined for each of the plurality of types of pixel cells.

It is disclosed the signal processing apparatus, wherein the first threshold value is variably determined in accordance with the positions of the second pixel cells in a region where the first pixel cells and the second pixel cells are two dimensionally arranged.

It is disclosed the signal processing apparatus, wherein the first threshold value is variably determined in accordance with a focal distance of the optical system.

It is disclosed the signal processing apparatus, wherein the correction processing unit performs correction using the output signals of the plurality of first pixel cells in a first range around the second pixel cell in the first correction processing, and the correction processing unit amplifies the output signal of the second pixel cell by multiplying a gain which makes the output signal of the second pixel cell close to an average of the output signals of the plurality of first pixel cells in a second range which is wider than the first range around the second pixel cell by the output signal of the second pixel cell in the second correction processing.

It is disclosed an imaging device comprising: the signal processing apparatus, and the imaging element, wherein the optical system is detachable.

It is disclosed an imaging device comprising: the signal processing apparatus, and the imaging element.

It is disclosed a signal correcting method of correcting signals output from a plurality of second pixel cells of an imaging element, the imaging element imaging a subject through an optical system and including a plurality of first pixel cells for imaging and the second pixel cells for focus detection which are two dimensionally arranged, the method comprising: a correction processing step which performs one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell, wherein in the correction processing step, it is determined which one of the first correction processing and the second correction processing is to be performed using at least an F value at the time of imaging which is an F value of a diaphragm included in the optical system at the time of imaging to obtain a signal to be corrected.

According to any one of the disclosed matters, an a signal processing apparatus which precisely corrects an output signal of a focus detecting pixel cell to improve a captured image quality, an imaging device including the same, and a signal correcting method may be provided.

Although the present invention has been described in detail with reference to specific exemplary embodiments thereof, it is obvious to those skilled in the art that various changes or modifications may be made without departing from the spirit and scope of the present invention.

The present application is based on Japanese Patent Application (Patent Application No. 2012-108560) filed on May 10, 2012, the content of which is incorporated herein by reference.

What is claimed is:

1. A signal processing apparatus for processing a signal from an imaging element, the imaging element including a plurality of first pixel cells for imaging and a plurality of second pixel cells for focus detection which are two dimensionally arranged and imaging a subject through an optical system, the signal processing apparatus comprising:
- a digital signal processor configured to perform one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell,
- wherein the digital signal processor is configured to determine which one of the first correction processing and the second correction processing is to be performed using at least an F value at the time of imaging which is an F value of a diaphragm included in the optical system at the time of imaging to obtain a signal to be corrected,
- wherein the digital signal processor is configured to calculate:
- an average of the output signals of the first pixel cells around the second pixel cell; and
- a flatness of the output signals of the first pixel cells around the second pixel cell, and
- wherein the digital signal processor is configured to determine which one of the first correction processing and the second correction processing is to be performed using the average, the flatness, and the F value at the time of imaging.

2. The signal processing apparatus of claim 1,
- wherein the flatness is a dispersion,
- when the dispersion and the average satisfy a first condition, the digital signal processor is configured to perform the first correction processing,
- when the dispersion and the average satisfy a second condition, the digital signal processor is configured to perform the second correction processing,
- the signal processing apparatus further includes a memory which stores a plurality of types of combinations of the first condition and the second condition, the plurality of types of combinations being determined to correspond to divided ranges of an settable range of the F value, and
- the digital signal processor is configured to selectively use one of the plurality of types of combinations corresponding to one of the divided ranges which includes the F value at the time of imaging.

3. The signal processing apparatus of claim 2,
- wherein a graph has the average on a first axis and the dispersion on a second axis,
- the first condition is a condition where in the graph, a gradient of a straight line connecting a point obtained by plotting the average and the dispersion to an origin point is smaller than a predetermined threshold gradient,
- the second condition is a condition where in the graph, the gradient of the straight line is equal to or larger than the threshold gradient, and
- the plurality of types of combinations have different threshold gradients.

4. The signal processing apparatus of claim 2,
- wherein the second pixel cells include a plurality of types of pixel cells which receives a plurality of light fluxes passing through different pupil regions of the optical system, and
- an F value which becomes a border of the divided ranges varies depending on the plurality of types of pixel cells.

5. The signal processing apparatus of claim 2,
- wherein the F value which becomes a border of the divided ranges is variably determined in accordance with the positions of the second pixel cells in a region where the first pixel cells and the second pixel cells are two dimensionally arranged.

6. The signal processing apparatus of claim 2,
- wherein the F value which becomes a border of the divided ranges is variably determined in accordance with a focal distance of the optical system.

7. A signal processing apparatus for processing a signal from an imaging element, the imaging element including a plurality of first pixel cells for imaging and a plurality of second pixel cells for focus detection which are two dimensionally arranged and imaging a subject through an optical system, the signal processing apparatus comprising:
- a digital signal processor configured to perform one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell,
- wherein the digital signal processor configured to determine which one of the first correction processing and the second correction processing is to be performed using at least an F value at the time of imaging which is an F value of a diaphragm included in the optical system at the time of imaging to obtain a signal to be corrected,
- when the F value at the time of imaging is smaller than a predetermined first threshold value, the digital signal processor is configured to perform the first correction processing,
- when the F value at the time of imaging is equal to or larger than the first threshold value, the digital signal processor is configured to perform the second correction processing,
- the second pixel cells include a plurality of types of pixel cells which receives a plurality of light fluxes passing through different pupil regions of the optical system, and
- the first threshold value is variably determined for each of the plurality of types of pixel cells.

8. The signal processing apparatus of claim 7,
- wherein the first threshold value is variably determined in accordance with the positions of the second pixel cells in a region where the first pixel cells and the second pixel cells are two dimensionally arranged.

9. The signal processing apparatus of claim 7,
- wherein the first threshold value is variably determined in accordance with a focal distance of the optical system.

10. The signal processing apparatus of claim 1,
- wherein the digital signal processor is configured to perform correction using the output signals of the plurality of first pixel cells in a first range around the second pixel cell in the first correction processing, and
- the digital signal processor is configured to amplify the output signal of the second pixel cell by multiplying a gain which makes the output signal of the second pixel cell close to an average of the output signals of the plurality of first pixel cells in a second range which is wider than the first range around the second pixel cell by the output signal of the second pixel cell in the second correction processing.

11. A signal processing apparatus for processing a signal from an imaging element, the imaging element including a plurality of first pixel cells for imaging and a plurality of second pixel cells for focus detection which are two dimensionally arranged and imaging a subject through an optical system, the signal processing apparatus comprising:
- a digital signal processor configured to perform one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell,
- wherein the digital signal processor is configured to determine which one of the first correction processing and the second correction processing is to be performed using at least an F value at the time of imaging which is an F value of a diaphragm included in the optical system at the time of imaging to obtain a signal to be corrected,
- the digital signal processor is configured to perform correction using the output signals of the plurality of first pixel cells in a first range around the second pixel cell in the first correction processing, and
- the digital signal processor is configured to amplify the output signal of the second pixel cell by multiplying a gain which makes the output signal of the second pixel cell close to an average of the output signals of the plurality of first pixel cells in a second range which is wider than the first range around the second pixel cell by the output signal of the second pixel cell in the second correction processing.

12. A signal processing apparatus for processing a signal from an imaging element, the imaging element including a plurality of first pixel cells for imaging and a plurality of second pixel cells for focus detection which are two dimensionally arranged and imaging a subject through an optical system, the signal processing apparatus comprising:
- a digital signal processor configured to perform one of first correction processing which corrects an output signal of each of the second pixel cells by substituting a signal generated using output signals of the first pixel cells around the second pixel cell for the output signal of the second pixel cell and second correction processing which corrects the output signal of the second pixel cell by amplifying the output signal of the second pixel cell,
- wherein the digital signal processor is configured to determine which one of the first correction processing and the second correction processing is to be performed using at least an F value at the time of imaging which is an F value of a diaphragm included in the optical system at the time of imaging to obtain a signal to be corrected,
- when the F value at the time of imaging is smaller than a predetermined first threshold value, the digital signal processor is configured to perform the first correction processing,
- when the F value at the time of imaging is equal to or larger than the first threshold value, the digital signal processor is configured to perform the second correction processing,
- the digital signal processor is configured to perform correction using the output signals of the plurality of first pixel cells in a first range around the second pixel cell in the first correction processing, and
- the digital signal processor is configured to amplify the output signal of the second pixel cell by multiplying a gain which makes the output signal of the second pixel cell close to an average of the output signals of the plurality of first pixel cells in a second range which is wider than the first range around the second pixel cell by the output signal of the second pixel cell in the second correction processing.

* * * * *